United States Patent [19]

Kaneko

[11] Patent Number: 5,355,159
[45] Date of Patent: Oct. 11, 1994

[54] COLOR FACSIMILE APPARATUS WHICH WARNS OF COLORANT AROMALIES

[75] Inventor: Yoji Kaneko, Yokohama, Japan

[73] Assignee: Canon Kabushiki Kaisha, Tokyo, Japan

[21] Appl. No.: 772,688

[22] Filed: Oct. 7, 1991

[30] Foreign Application Priority Data

Oct. 8, 1990 [JP] Japan .................................. 2-270302
Oct. 8, 1990 [JP] Japan .................................. 2-270303
Oct. 8, 1990 [JP] Japan .................................. 2-270304

[51] Int. Cl.⁵ .............................................. B41J 2/01
[52] U.S. Cl. ..................................... 349/19; 358/502; 358/504; 347/3; 347/7
[58] Field of Search ............... 346/140 R; 358/75, 77, 358/78, 80, 296; 355/206

[56] References Cited

U.S. PATENT DOCUMENTS

| | | | |
|---|---|---|---|
| 4,521,805 | 6/1985 | Ayata | 358/296 X |
| 4,707,713 | 11/1987 | Ayata | 346/140 R |
| 4,922,294 | 5/1990 | Nakagami | 355/206 X |

*Primary Examiner*—Joseph W. Hartary
*Attorney, Agent, or Firm*—Fitzpatrick, Cella, Harper & Scinto

[57] ABSTRACT

There is disclosed a color facsimile apparatus capable of communication of a color image, utilizing plural colorants in the printing unit, wherein, when one of the colorants runs out in the printing unit, such colorant is replaced by another colorant and the image printout is conducted with a varied resolution, for example with a reduced image size, in order that the operator can immediately recognize the absence of the colorant.

10 Claims, 8 Drawing Sheets

| INK EMPTY | COLOR SIGNAL TO BE CONVERTED |
|---|---|
| Y | Y ⟶ M |
| Y | Y ⟶ C |
| Y | YMC ⟶ K |
| M | M ⟶ Y |
| M | M ⟶ C |
| M | YMC ⟶ K |
| C | C ⟶ Y |
| C | C ⟶ M |
| C | YMC ⟶ K |
| K | K ⟶ Y/M/C |

THIS PRINT SAMPLE IS FOR WARNING INK EMPTY

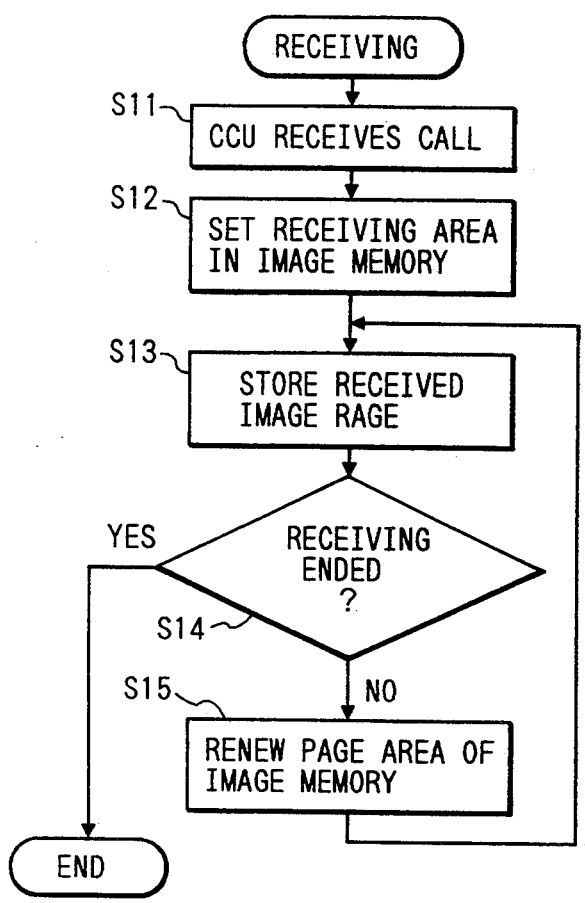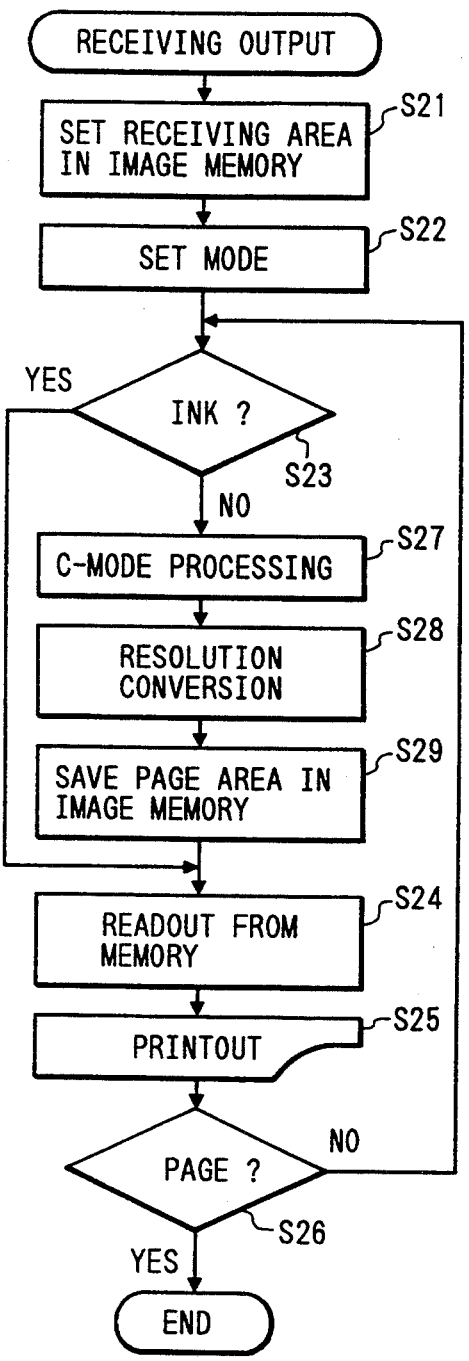

COLOR FACSIMILE APPARATUS WHICH WARNS OF COLORANT AROMALIES

BACKGROUND OF THE INVENTION

1. Field of the Invention

The present invention relates to a facsimile apparatus capable of communication of color images.

2. Related Background Art

In the conventional facsimile apparatus designed for dealing with a black-and-white image, since the printing unit employs only one ink, the printing operation becomes impossible if said ink is used up.

Consequently, such apparatus has been designed, if in the copy mode, to interrupt the copying operation, or, if in the facsimile reception mode, to refuse the reception or to accumulate the received text in a memory if such memory usable for substitute reception is available.

In such case of ink exhaustion, therefore, the copying operation cannot be conducted in the copying mode until the ink is replenished, and the text stored in the memory by substitute reception cannot be confirmed until the printout is made after ink replenishment.

Also, in a color facsimile apparatus provided with a printing unit for printing a color image with inks of plural colors and capable of communicating a color image, proper color image printing becomes no longer possible if one of plural inks runs out. In such case, therefore, interruption of copying operation or reception or substitute reception becomes required as in the black-and-white facsimile apparatus explained above, so that there will result a delay in the copying operation or in the output of the received text.

SUMMARY OF THE INVENTION

An object of the present invention is to provide a color facsimile apparatus capable of resolving the above-mentioned drawbacks.

Another object of the present invention is to provide a color image forming apparatus allowing confirmation of the received image even in the case of exhaustion of coloring material, and also allowing the user to clearly recognize such exhaustion of the coloring material, together with said confirmation.

Still another object of the present invention is to provide a color image forming apparatus capable of recording a received image on a recording material even in the case of exhaustion of the coloring material and allowing the used to clearly recognize such exhaustion from the recording material only.

The foregoing objects can be attained, according to an embodiment of the present invention, by a facsimile apparatus capable of color image communication, utilizing plural coloring materials in the printing unit, wherein, in the case of exhaustion of any of coloring materials, the exhausted coloring material is replaced by another coloring material and the image output is made with a varied image resolving power.

Still another object of the present invention is to provide a color facsimile apparatus with novel functions.

Still other objects of the present invention, and the advantages thereof, will become fully apparent from the following description of the preferred embodiments, which is to be taken in conjunction with the attached drawings.

BRIEF DESCRIPTION OF THE DRAWINGS

FIG. 5 is a flow chart showing a receiving sequence in said embodiment;

FIG. 6 is a flow chart showing a printing sequence after reception in said embodiment;

DETAILED DESCRIPTION OF THE PREFERRED EMBODIMENTS

Figure 1:
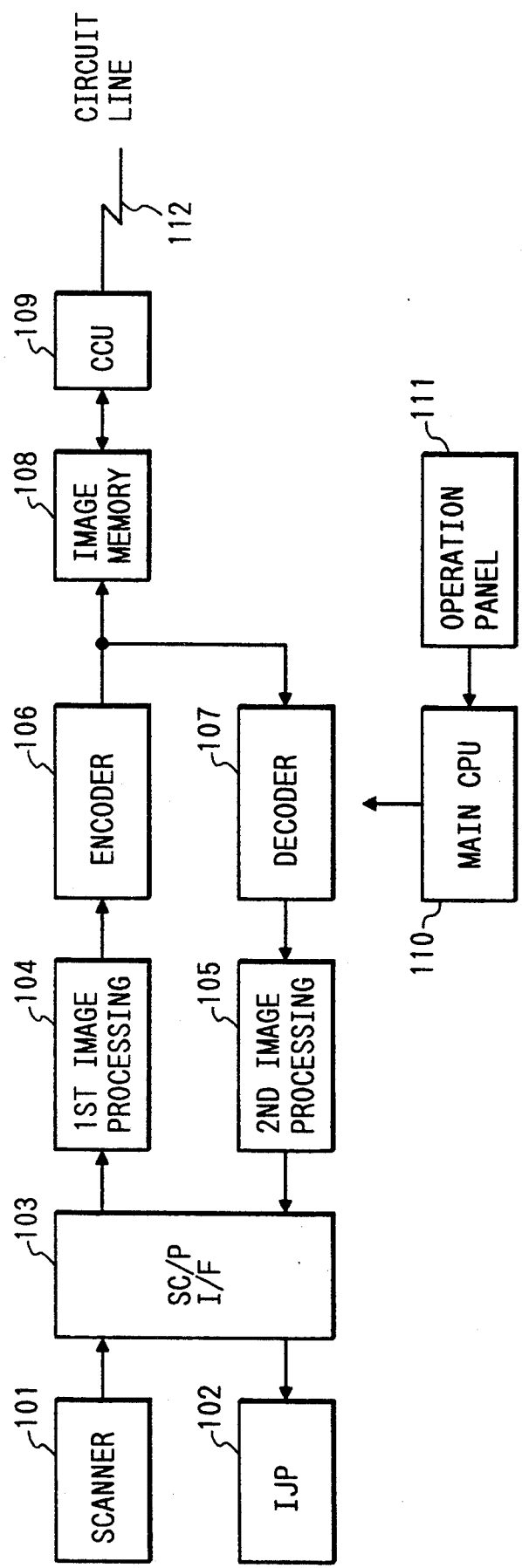
FIG. 1 is a block diagram of a facsimile apparatus constituting an embodiment of the present invention.

FIG. 1 is a block diagram of a facsimile apparatus constituting an embodiment of the present invention.

The facsimile apparatus of the present embodiment is capable of communicating color image data of red, green and blue (R, G, B) in addition to ordinary black-and-white image data, and effects communication by converting multi-value continuous-tone color image data into binary pseudo-continuous-tone color image data. Also, in the color image reproduction, yellow, magenta, cyan and black (YMCK) data are generated from said RGB data and are used for printing a color image with inks of corresponding colors.

In the following there will be explained various components.

A scanner 101 reads an original image and generates multi-value digital RGB color image data.

An ink jet printer 102 receives the multi-value RGB color image data from the scanner 101, converts said data into YMCK ink characteristics and prints a color image on a recording sheet by means of an ink jet recording system.

A scanner/printer interface 103 effects interfacing for the image data and the control signals, between said scanner 101 or printer 102 and the main body circuit of the facsimile apparatus.

A first image processing unit 104 effects binary digitization by an error diffusion method and other image processings on said multi-value RGB color image data.

A second image processing unit 105 effects conversion to multi-value data and color/monochrome conversion on the binary RGB color image data. Said color/monochrome conversion is conducted by determining the black component K as a function of R, G and B according to the following equation:

$$K = 0.3R + 0.59G + 0.11B.$$

An encoder 106 converts the binary color image data into facsimile codes for example by arithmetic encoding or MMR encoding.

A decoder 107 decodes the received binary color image data.

An image memory 108 serves to store the encoded transmission image data and the received image data in units of a page, and has a capacity of about 2 MB. It is composed of a semiconductor memory such as SRAM or DRAM, including an address control unit. Said image memory may also be composed of a magnetic rigid disk or the like.

A communication control unit (CCU) 109 is connected to a communication channel 112, and serves to control the facsimile protocol, to effect communication with the destination station and to transmit and receive image data.

A main CPU 110 effects the sequence control of the entire apparatus.

An operation panel 111, connected with the main CPU 110, is provided with a display unit and a keyboard for effecting various displays and input operations.

A communication channel 12 is connected from the CCU 109 to a digital data network or an ISDN.

In the following there will be explained the operation of transmission and reception of the present embodiment.

In the transmission, the image data read by the scanner 101 are supplied through the interface 103, then binary digitized in the first image processing unit 104, further converted by the encoder 106 into facsimile codes, and stored in the units of a page in the image memory 108.

After the sequence control of these operations, the main CPU 110 initiates communication by activating the CCU 109. The CCU 109, after making connection with the destination, reads the transmission image data from the image memory 108 and effects communication.

In the reception, when a call is received from the channel 112, the CCU 109 stores the received image data in the image memory 108 in the unit of a page.

Thereafter the main CPU 110 effects control to send the received image to the printer 102. More specifically, it designates the address of the received image data stored in the image memory 108, and activates the decoder 107. The received image data in the form of facsimile codes are decoded by the decoder 107 into binary color image data, which are further converted by the second image processing unit 105 into multi-value RGB color image data. Said image data are transmitted through the interface 103 to the printer 102 and printed as a YMCK color image therein.

Figure 2:
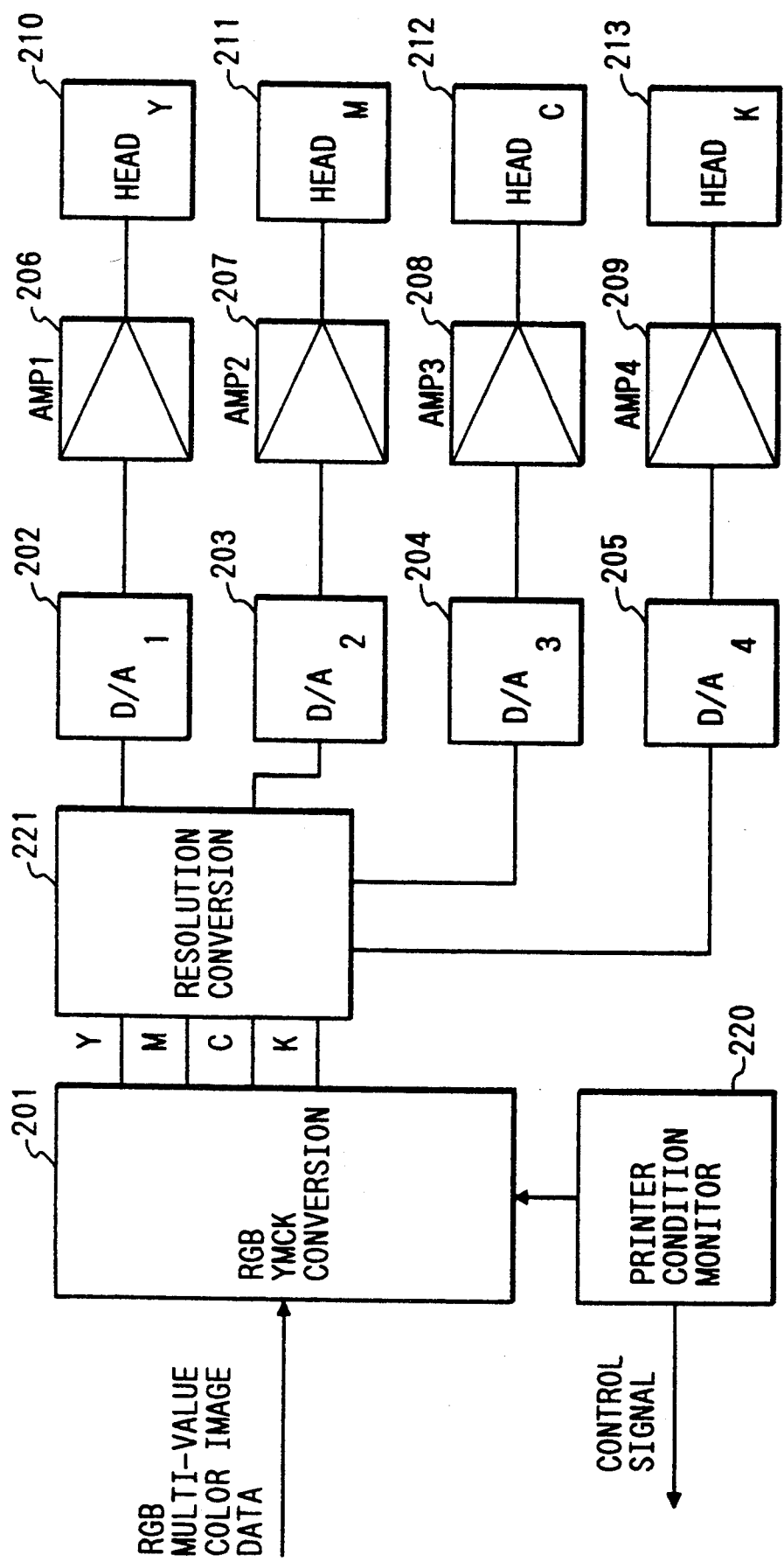
FIG. 2 is a block diagram of the circuit of a printer employed in said embodiment.

FIG. 2 is a block diagram of the circuit of the printer 102.

An RGB/YMCK conversion unit 201 receives multi-value RGB color image data and converts said data into YMCK image data which match the characteristics of the inks to be employed. Also it has a selector for varying YMCK signals in an ink empty state, as will be explained later.

A resolution conversion unit 221 effects a conversion of resolution, for example an image reduction, in the ink empty state, as will be explained later.

D/A converters 202-205 (D/A1-D/A4) respectively convert the Y, M, C and K digital data into analog signals.

Amplifiers 206-209 (AMP1-AMP4) respectively drive printing heads 210-213, according to said Y, M, C and K analog signals.

Printing heads 210-213 respectively print inks of Y, M, C and K colors in response to drive signals from the amplifiers 206-209.

The ink jet recording unit employed in the present embodiment is a unit discharging ink in response to analog signals, but there may also be employed other recording units, for example a unit for recording binary signals in response to Y, M, C and K digital data.

Figures 3, 10:
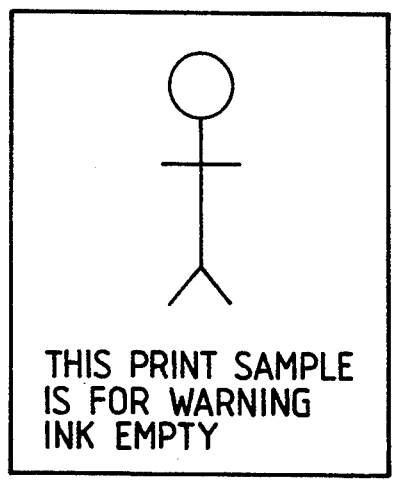
FIG. 3 is a chart showing combinations of color conversion in said embodiment.
FIG. 10 is a view showing an example of printing obtained by the circuit shown in FIG. 9.

A printer state monitor 220 detects various states of the printer, namely ink empty state in each of the printing heads 210-213, empty state and jammed recording sheet state by different sensors, and sends the obtained status information to the interface 103. Said monitor also controls the RGB/YMCK conversion unit 201, in the case of an ink empty state, to replace the Y, M, C or K signal corresponding to the exhausted ink with another color signal. The replacement of the color signal in the present embodiment is conducted as shown in FIG. 3.

Such ink replacement for the emptied ink enables image reproduction, though the colors of the image are different due to the change in ink combination.

Figure 4:
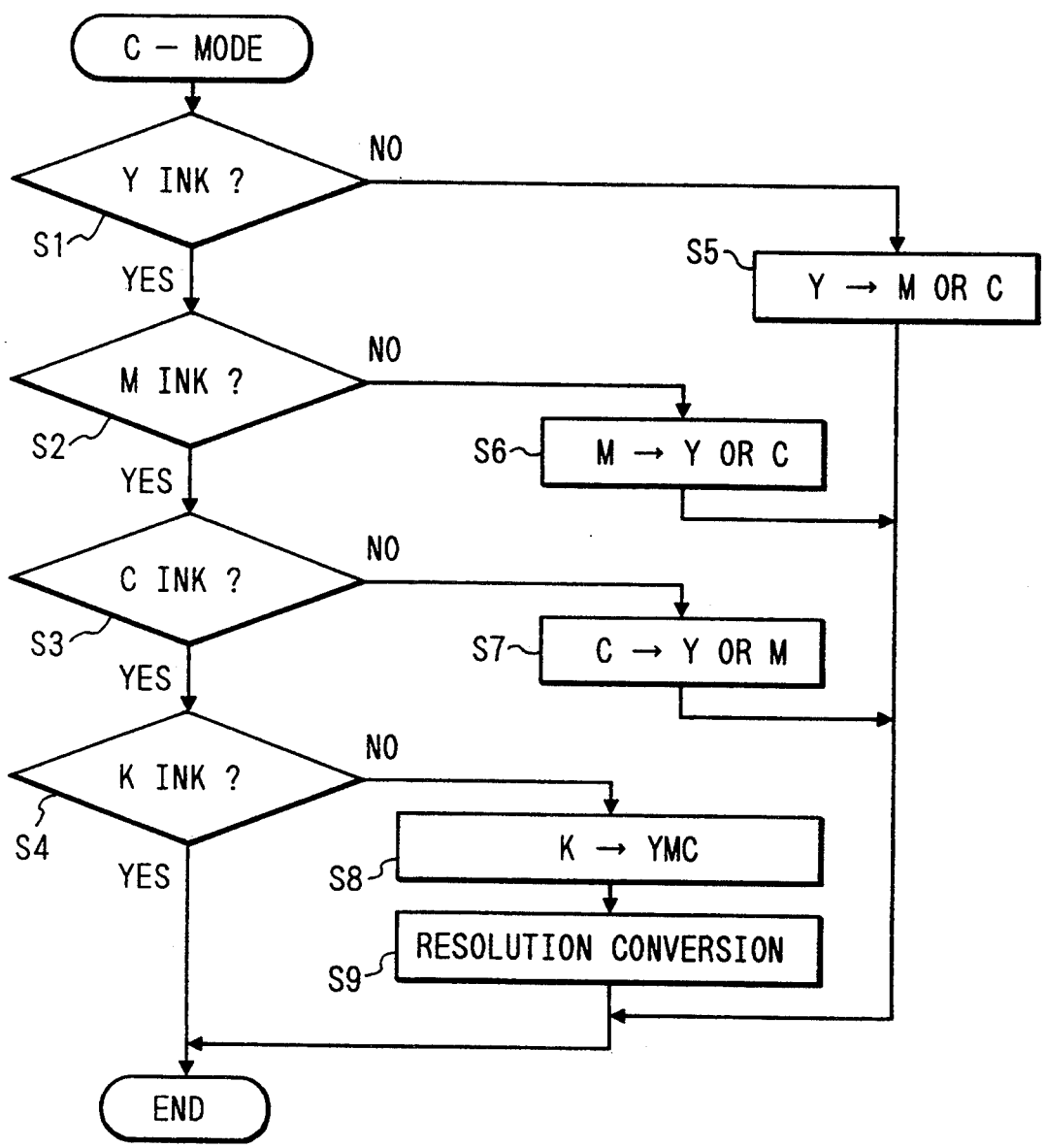
FIG. 4 is a flow chart showing control sequence of a color conversion selector in a RGB/YMCK conversion unit in said embodiment.

FIG. 4 is a flow chart showing the control sequence of color conversion in the RGB/CMYK conversion unit 201.

This conversion mode will hereinafter be called C mode.

At first there is discriminated whether YM, M, C and K inks are present (S1-S4), and, if Y ink is empty, the Y signal is converted to M or C signal (S5). If M ink is empty, the M signal is converted to Y or C signal (S6). If C ink is empty, the C signal is converted to Y or M signal (S7). If K ink is empty, the K signal is converted to Y, M and C signals (S8).

If the conversion is conducted, in response to the detection of ink empty state, in any of the steps S5-S8, a conversion of resolution is conducted (S9). A reduced print is advantageous in avoiding waste of a sheet and in indicating the approximate state of image, when the image is printed with improper colors.

FIG. 5 is a flow chart showing the receiving operations of the present embodiment.

At first, a call received from the channel 112 is informed from the CCU 109 to the main CPU 110 (S11). In response, the main CPU 110 prepares for image reception by setting an address for a reception area in the image memory 108 (S12).

Then the received image is transferred from the CCU 109 to image memory 108 and stored in the units of a page therein (S13). The CCU 109 inspects the end of reception by the facsimile protocol. If the reception is completed, it terminates the communication and proceeds to a next step (S14). Then an area (of units of a page) is set in the image memory 108 and the address is renewed (S15).

FIG. 6 is a flow chart of printing sequence after reception.

At first the main CPU 110 sets the address for the received image area in the image memory 108 (S21), and sets the mode of the decoder 107 and the second image processing unit 105 (S22).

Then there is discriminated whether the inks are present in the printer 102 (S23), and, if the inks are present so that the printing operation is possible, the received image is read from the image memory 108 (S24) and a page is printed in the printer 102 (S25). This sequence is thereafter repeated, and, when all the pages are printed (S26), the sequence is terminated.

On the other hand, if the step S23 discriminates an absence of ink in the printer 102, the main CPU 110 effects the process of C mode shown in FIG. 4 (S27)

and the conversion of resolution (S28), and saves the current page area in the main CPU 110 in order to store the received image of the image memory 108 (S29).

Subsequently, when the operator replenishes the ink and instructs, through the operation panel 111, the output of the received image saved in said step S29, said received image is printed.

Figure 7:
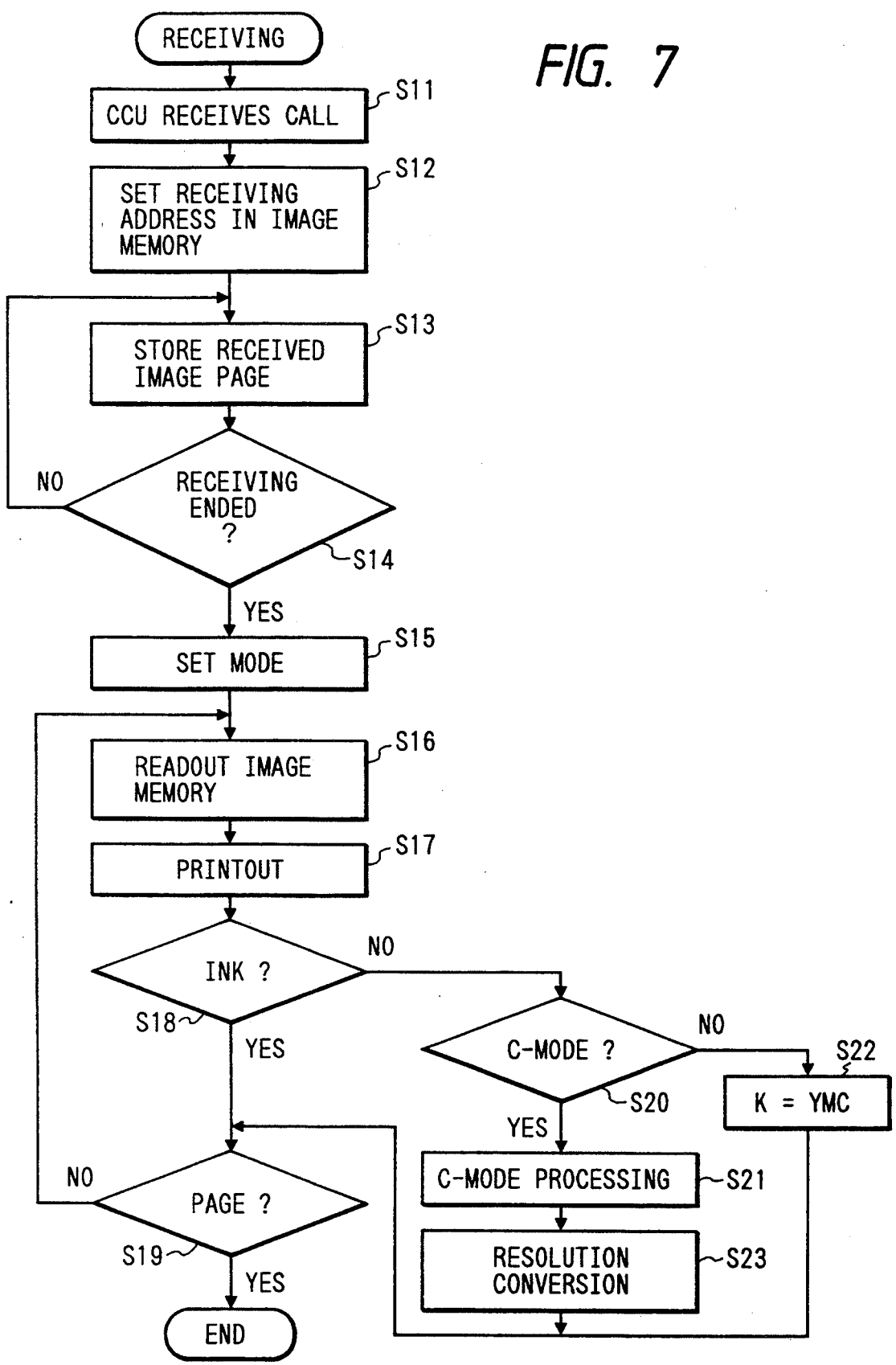
FIG. 7 is a flow chart of a second embodiment.

In the following there will be explained a second embodiment of the present invention with reference to FIG. 7, which is a flow chart showing another receiving operation.

When a call is received from the channel 112, it is informed from the CCU 109 to the main CPU 110 (S11). In response the main CPU 110 prepares for the image reception by setting an address for a reception area in the image memory 108 (S12).

Then the received image is transferred from the CCU 109 to the image memory 108 and stored therein in the unit of a page (S13). The CCU 109 inspects the end of reception by the facsimile protocol, and, if the reception is completed, the communication is terminated and the sequence proceeds to the next step (S14).

Then the main CPU 110 sets the mode of the decoder 107 and the second image processing unit 105 (S15), reads the received image by setting the address for the reception area of the image memory 108 (S16) and prints said image by means of the printer 102 (S17).

Then there is discriminated whether inks are present in the printer 102 (S18), and, if inks are present thereby enabling printing operation, there is discriminated whether the image memory 108 contains the received image. If the received image is present, the sequence returns to the step S16 to repeat the printing operation. The sequence is terminated when all the pages are printed (S19).

On the other hand, if the step S18 identifies an absence of ink of Y, M or C color, the sequence of C mode shown in FIG. 4 is conducted (S21). If the ink of K color is absent, the K signal is converted into Y, M and C signals (S22), then the conversion of resolution is conducted (S23), and the sequence returns to the step S16 to effect the printing operation.

Figure 8:
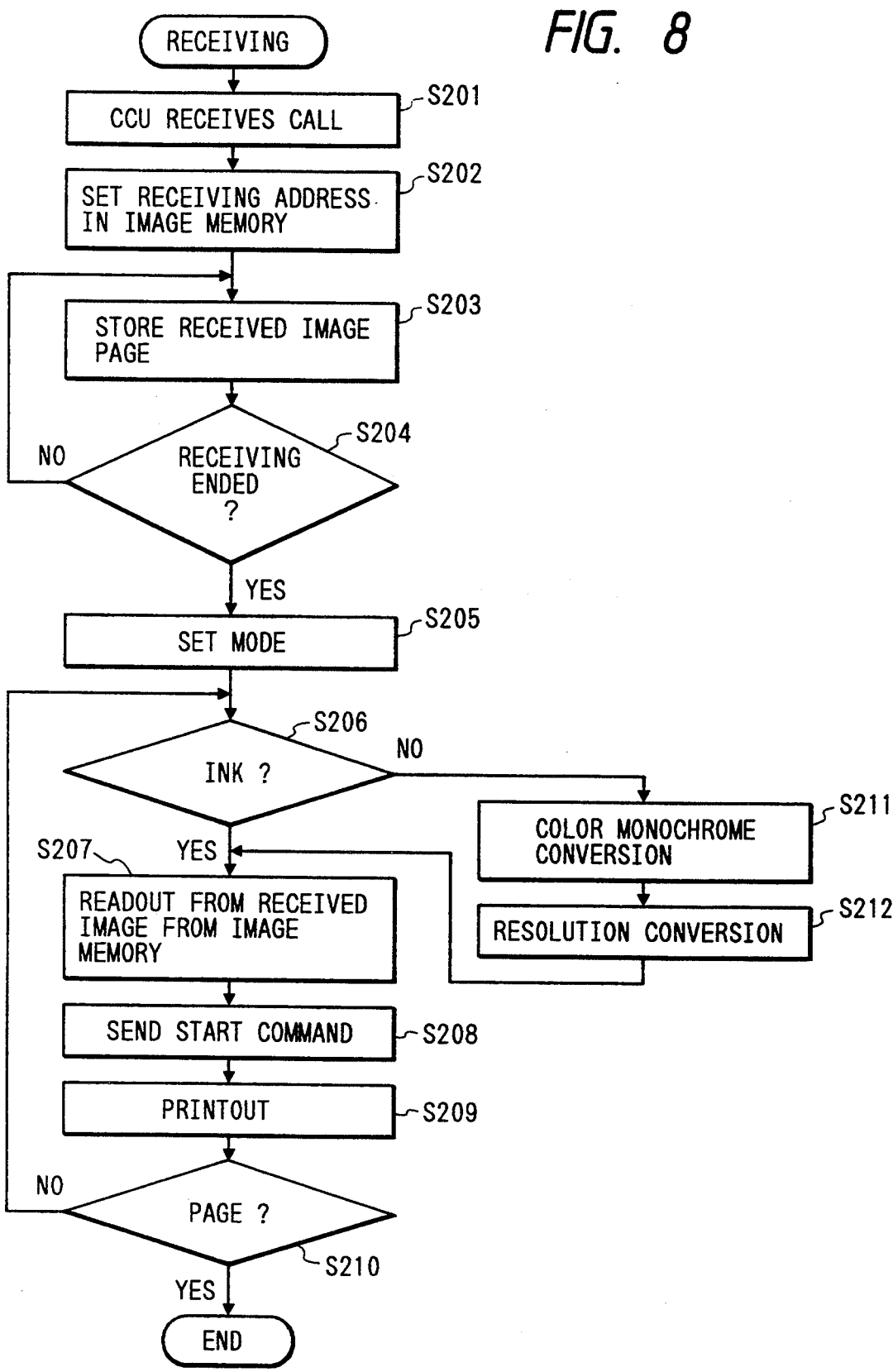
FIG. 8 is a flow chart of a third embodiment.

FIG. 8 is a flow chart showing still another receiving operation.

At first, a call received from the channel 112 is informed from the CCU 109 to the main CPU 110 (S201). In response the main CPU 110 prepares for the image reception by setting an address for a reception area in the image memory 108 (S202).

Then the received image is transferred from the CCU 109 to the image memory 108 and stored therein in the unit of a page (S203). The CCU 109 inspects the end of reception by the facsimile protocol, and, when the reception is completed, the communication is terminated and the sequence proceeds to the next step (S204).

Subsequently the main CPU 110 sets the mode of the decoder 107 and the second image processing unit 105 (S205), and discriminates whether all the inks are present in the printer 102 (S206). If all the inks are present, enabling the printing operation, the main CPU 110 reads the received image from the image memory 108 (S207), and sends a start command to the image processing unit 105 and the decoder 107 (S208). Thus the received image of a page is printed by the printer 102 (S209).

On the other hand, if the step S206 identifies the absence of ink in the printer 102, the main CPU 110 sets the mode for color/monochrome conversion in the second image processing unit 105.

Thus the RGB image data are converted into black-and-white image data, which are used as R, G and B signals (S211). In this case, an ink, which is chosen from among C, M, Y and K inks and which has not been exhausted, is used for printing. For example, the K ink is preferentially used if it remains, and another ink is used if the K ink is absent.

After said data conversion, the conversion of resolution is conducted (S212) to obtain a reduced print, which is advantageous in avoiding the waste of recording sheets and in indicating the status of the image in an approximate manner even though the image is printed in an imperfect state.

Thus, starting from the next page, the printer 102 provides a monochromatic image instead of a color image (S207–209).

The above-explained operations are repeated until all the received pages are printed, and the sequence is then terminated (S210).

Among the color image data stored in the image memory 108, those printed in monochromatic state because of the ink empty state may be retained in said image memory for reprinting after the ink replenishment.

In the foregoing embodiments, in case of exhaustion of the coloring material such as ink, the image stored in the memory is printed by the remaining coloring material, with a conversion in the resolution, but the present invention is not limited to such embodiments and may be realized in any form that will enable the user to recognize the exhaustion of the coloring material by looking at the printed result.

Figure 9:
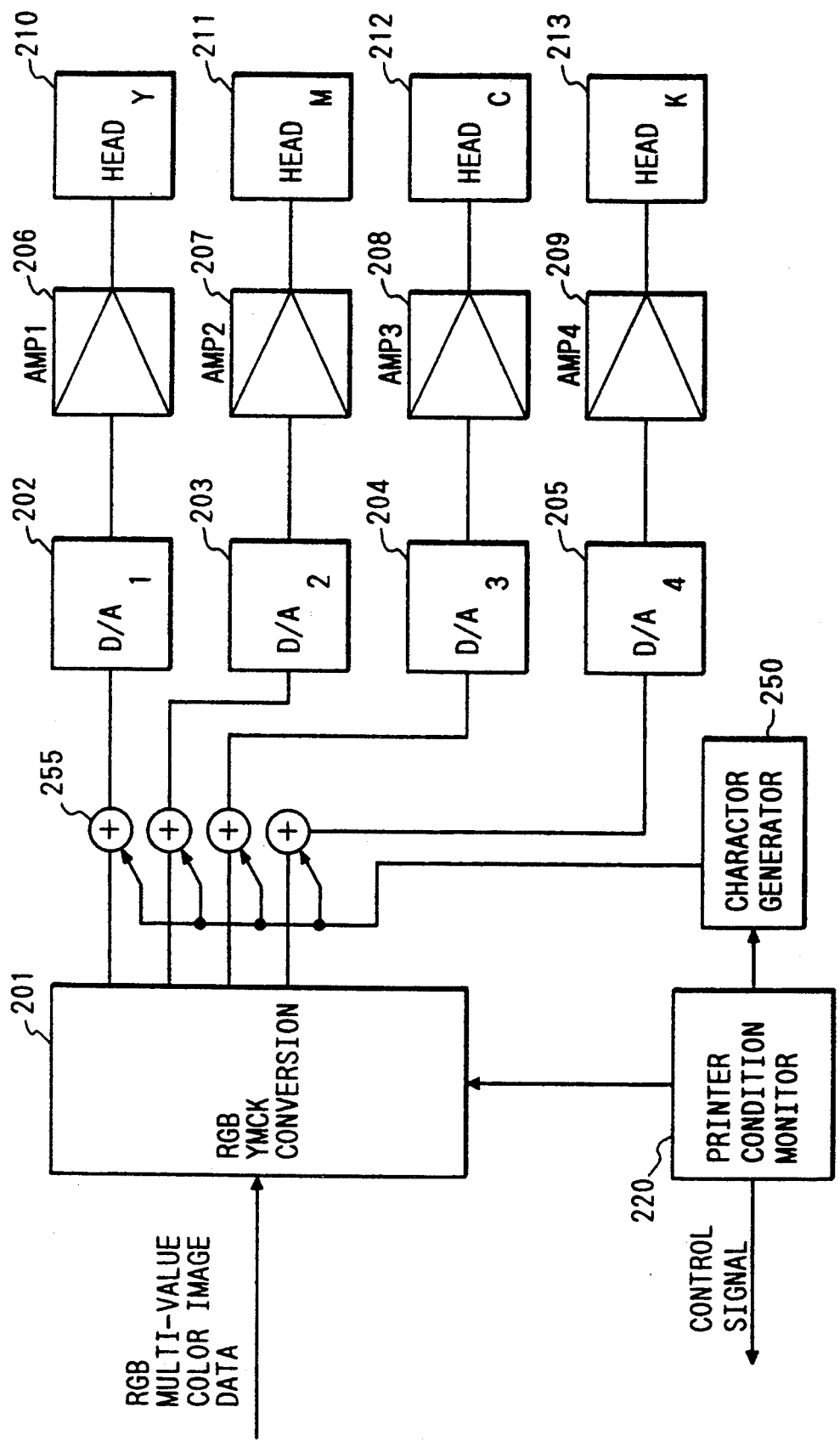
FIG. 9 is a block diagram of the second embodiment.

Now reference is made to FIG. 9, showing an embodiment which provides a print indicating the empty state of the coloring material, as shown in FIG. 10, instead of the conversion of resolution explained before.

In FIG. 9, the same components as those in FIG. 2 are represented by the same numbers and will not be explained further.

In the circuit shown in FIG. 9, there is provided a character generator 250, which generates an image signal, for printing a sentence indicating which of the Y, M, C and K inks is empty, based on the output from the printer state monitor circuit 220. The image signal from said character generator 250 is added by an adder 255 to the output of the RGB/YMCK conversion circuit.

Also, in such embodiment, the image memory 108 shown in FIG. 1 may be so controlled as to print only a part of the images stored in said memory, for example only the first page thereof, instead of printing all the images.

Such control prevents the waste of the recording sheets.

Also, the text shown in FIG. 10 may be replaced by another text, or a symbol indicating the absence of the coloring material.

The printing unit to be employed in the foregoing embodiments may use an electrophotographic method utilizing color toners, or a thermal transfer method utilizing color ink ribbons. In summary, the present invention is not limited as to the recording method.

Also, in the foregoing embodiment the ink empty process for detecting the absence of ink is conducted page by page, but it may instead be conducted for each printing line or each printing block.

Furthermore, though the foregoing embodiments have been limited to color facsimile apparatus, the present invention is likewise applicable to a color printer. Also, in the foregoing embodiments the received image is once stored in a memory, but the present invention is likewise applicable to an apparatus lacking the memory to store a page.

As explained in the foregoing, these embodiments allow, when the coloring material is exhausted in the printing unit, to effect printing operation with another coloring material, thereby enabling secure output of the received image and facilitating the confirmation for example of a text.

Also it is rendered possible to repeat the output of an unnecessary document, and to reduce the running cost of the apparatus.

What is claimed is:

1. An apparatus comprising:
   image forming means for forming an image corresponding to received color image information, utilizing plural colorants;
   detection means for detecting an abnormality in one of said plural colorants; and
   control means for causing said image forming means to form the image in a reduced size without using said one of said plural colorants.

2. An apparatus according to claim 1, wherein said colorants are inks.

3. An apparatus according to claim 1, wherein said image forming means is based on an ink jet recording method.

4. An apparatus according to claim 1, wherein said control means includes conversion means for converting the resolution of a color image signal representing the received color image information.

5. An apparatus according to claim 4, wherein said conversion means is adapted to reduce the size of an image represented by said color image signal.

6. An apparatus according to claim 1, wherein said control means includes means for adding another image signal to a color image signal representing the received color image information.

7. An apparatus according to claim 6, wherein said other image signal is a character signal.

8. An apparatus comprising:
   image forming means for forming an image corresponding to received color image information, utilizing plural colorants;
   detection means for detecting an abnormality in said plural colorants;
   conversion means for converting a particular component in a color image signal representing the received color image information, which particular component corresponds to a colorant in which the abnormality is detected by said detection means, to another component and adding another image signal that represents said abnormality, for supply to said image forming means; and
   control means, responsive to detection of the abnormality by said detection means, for controlling said image forming means to reduce a size of the image formed by said image forming means.

9. An apparatus according to claim 8, wherein said colorants are inks.

10. An apparatus according to claim 8, wherein said image forming means is based on an ink jet recording method.

* * * * *